United States Patent [19]

Miller et al.

[11] 4,038,490

[45] July 26, 1977

[54] WATER-SEAL SPLICE FOR COAXIAL CABLES AND METHOD OF MAKING SAME

[75] Inventors: Gerald K. Miller, Saratoga; Sam Lum, San Jose, both of Calif.

[73] Assignee: The United States of America as represented by the Secretary of the Navy, Washington, D.C.

[21] Appl. No.: 582,561

[22] Filed: May 30, 1975

[51] Int. Cl.² .................. H02G 15/08; H02G 1/14
[52] U.S. Cl. ................................ 174/88 C; 29/628; 156/49
[58] Field of Search ............... 174/88 C, 88 R, 84 R, 174/76, 21 R, 21 C, 22 R, 22 C, 70 S; 156/49, 56; 29/628

[56] References Cited

U.S. PATENT DOCUMENTS

| | | | |
|---|---|---|---|
| 2,444,075 | 6/1948 | Violette | 156/49 |
| 2,768,105 | 10/1956 | Dittmore et al. | 174/88 C UX |
| 2,981,649 | 4/1961 | Metcalf, Jr. | 156/49 X |
| 3,332,813 | 7/1967 | Clarke | 174/88 C |
| 3,356,551 | 12/1967 | Glenn et al. | 156/49 |
| 3,567,845 | 3/1971 | Bahder | 174/84 R |
| 3,783,057 | 1/1974 | McNerney | 174/84 R X |

FOREIGN PATENT DOCUMENTS

| | | | |
|---|---|---|---|
| 1,241,595 | 6/1967 | Germany | 174/88 R |
| 1,191,129 | 5/1970 | United Kingdom | 174/84 R |

Primary Examiner—Laramie E. Askin
Attorney, Agent, or Firm—R. S. Sciascia; R. F. Beers; S. Sheinbein

[57] ABSTRACT

A splicing technique for fluoro-polymer-jacketed coaxial cables comprising three bonding layers, with one of these bonding layers being located inside of the shield. The bonding agents are specially chosen to have thermal expansion coefficients matching the materials they are to bond to, and to have sufficient flexibility to provide strain relief and to prevent chafing and cut-through of the outer jacket at its emergence point from the outer potting layer.

7 Claims, 1 Drawing Figure

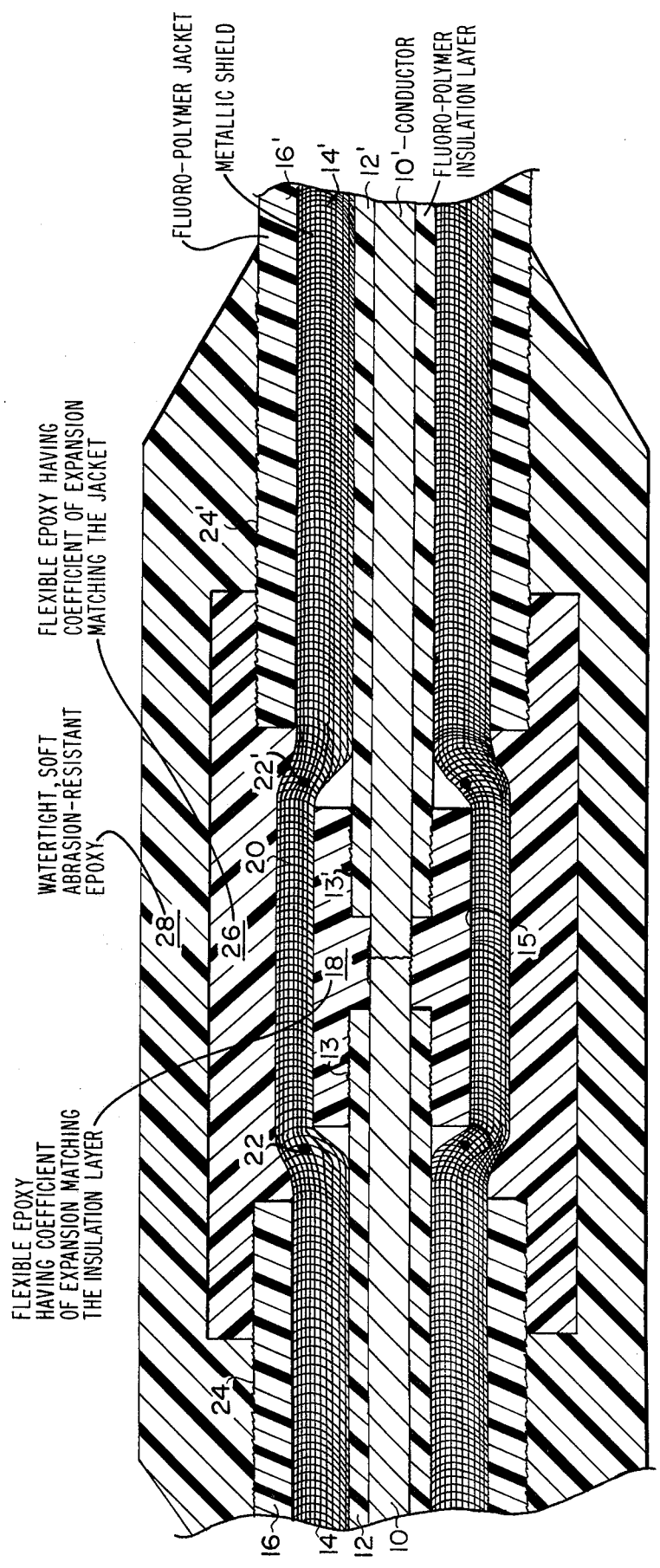

WATER-SEAL SPLICE FOR COAXIAL CABLES AND METHOD OF MAKING SAME

BACKGROUND OF THE INVENTION

1. Field of the Invention

The present invention relates generally to coaxialcable splicing and more particularly to a method and a means for obtaining a highly reliable water-seal for a Teflon-jacketed cable splice.

2. Description of the Prior Art

It has been determined that prior art potting materials and techniques used for the sealing of coaxial cables are unable to consistently supply the requisite water sealing under high pressures and over large temperature ranges when the cables have flexible outer jackets. Such prior-art methods generally comprise only a single step of potting. For example, a typical splicing technique would comprise the following steps. The center conductors of the coaxial cables to be spliced would be soldered together and then covered with a shrink tube set to overlap the adjacent dielectric layers of the cables. Then the shields of both cables would be joined either by stretching them over the shrink tubing and soldering or by installing a short piece of braided shield between the existing shields and soldering. Next, the flexible jackets (typically made of a fluoro-polymeric material) of the cables would be prepared for potting by etching their surfaces with special caustic compounds commercially available for this purpose. After these preparatory steps, the potting compound would then be mixed and applied to the entire splice area. This area would include an overlap region for the jackets of both of the cables. Initially the liquid potting compound would be contained in its position surrounding the splice by an appropriate holder until it cures.

Typical potting compounds utilized for cablesplicing become quite hard when completely cured. For example, Scotchcast 8, a frequently used potting compound, has a hardness of 70 on the Shore D hardness scale. When fluoro-polymer (Teflon) jacketed cables with such a splice are bent and flexed during handling, the hard edge of the cured potting cylinder tends to cut the jacket of the softer Teflon at its emergence point from the potting.

In addition, the coefficient of expansion for potting compounds such as Scotchcast 8 is 40% higher than the coefficient for Teflon. Thus temperature variations in the cable environment produce surface stress at the bond interface which tend to break the water seal. This is especially so if the pressure is high.

Finally, when water does get into the shield region (via Teflon breaks at the Teflon-potting interface), it can easily work its way along the shield down to the region where the shrink tubing is sealing the center conductor. Since this is not necessarily a watertight seal, the water could leak under the shrink tubing and form a low-resistance path between the center conductor and the shield, thus compromising the performance of the cable.

SUMMARY OF THE INVENTION

The present invention provides a splicing technique for overcoming the above-mentioned problems encountered with prior-art sealing methods. This technique comprises the application of watertight seals at three levels in the cable structure with a potting material specially chosen to have a thermal-expansion coefficient matching that of the cable jacket to be bonded. The potting material for the outermost sealing layer is chosen to be soft and flexible in order to prevent chafing and cutting of the jacket at its emergence from this outer potting layer.

OBJECTS OF THE INVENTION

An object of the present invention is to form a watertight seal at the splice-point of two coaxial cables.

A further object is to seal the splice area of a coaxial splice at several levels so that a proper seal is maintained even if the outermost seal is broken.

A still further object is to prevent the watertight seal of a cable splice from being broken by internal stresses due to temperature variations.

Yet, a further object is to prevent the potting seal in a cable splice from cutting or chafing the outer jacket of the coaxial cable.

Other objects, advantages and novel features of the present invention will become apparent from the following detailed description of the invention when considered in conjunction with the accompanying drawing.

BRIEF DESCRIPTION OF THE DRAWING

The single FIGURE is a sectioned, lengthwise view of a coaxial conductor splice following the present inventive splicing technique.

DETAILED DESCRIPTION OF THE INVENTION

The FIGURE shows a schematic diagram of a coaxial-cable splice. A typical cable design comprises a center conductor 10, a cylindrical dielectric layer 12, a metallic shield layer 14, and an outer flexible fluoropolymer jacket 16 enclosing the shielding layer 14.

The present inventive splicing technique comprises the following steps. First, the cables to be spliced are placed in an abutting position and the center conductors 10 and 10' are joined, typically by soldering. Then, the outer surfaces 13 and 13' of the dielectric layers 12 and 12', respectively, are etched with a caustic compound. These etched surfaces 13 and 13' are then potted with a liquid potting compound to form a cylinder enclosing the exposed ends of the conductors 10 and 10' and extending along the dielectric layers 12 and 12' for at least ¼ inch on each side to form a watertight seal. The potting compound 18 is specially chosen to have good flexibility after curing and to have a linear thermal expansion coefficient which matches that of the dielectric insulating layer 12. By way of example, if Teflon is used to form the insulating layer 12, then a potting material approximating Teflon's coefficient of linear thermal expansion of $12 \times 10^{-5}$ strain per degree centigrade should be used. An epoxy potting material having good flexibility and linear thermal expansion would be one having Aliphatic amine-bisphenol A epoxy resin as its active elements. A commercially available form of this compound is Scotchweld 2216 which is made by the 3M Company and has a coefficient of linear thermal expansion of $10.2 \times 10^{-5}$ (at $-18°$) to $13.4 \times 10^{-5}$ (at 27° C) strain per degree celsius.

After the requisite amount of time has elapsed for this potted cylinder 18 to cure (approximately 24 hours), the shields 14 and 14' are joined. This is accomplished in the figure by soldering a short piece of braided metallic shield 20 to the shields 14 and 14' at the points 22 and 22'.

Next, the outer surfaces, 24 and 24', of the Teflon jacket, 16 and 16', are etched with an appropriate caustic compound. Then a second layer of the specially chosen potting adhesive (Scotchweld 2216 in this example) is applied to form a watertight cylinder 26 enclosing the exposed portion of the shield 20 and extending at least ¼ inch along the etched surfaces, 24 and 24', of the Teflon jackets, 16 and 16'. This seal 26 is then allowed to cure.

Finally, a third layer of potting, 28, is applied on top of the second adhesive layer 26 of potting and well beyond its ends to seal the etched outer surfaces of the Teflon jackets, 16 and 16'. This final potting compound 28 is chosen for its softness, water resistance, and abrasion resistance. By way of example, a polyurethane containing free toluene diisocyanate and phenyl mercuric hydroxide such as Scotchcast 221 made by 3M was found to be suitable for Teflon-jacketed cable-splices. This soft, flexible, outer cylinder acts as a strain relief and eliminates the problems of cable cutting and cable chafing at the point of emergence of the cable from the outermost potting layer 28. This outer layer 28 also functions as the first outer seal layer and acts to protect the inner bonding layers, 18 and 26, of the cable from mechanical shock.

This triple-layer splicing technique provides the following advantages. Because of the matching of thermal expansion coefficients of the material to be bonded with that of the bonding agent, the potting bonds are not much affected by temperature changes. Also, because of the mechanical flexibility of the cured adhesive, the bonds can be maintained even under bending or twisting of the splice, i.e., the splice can conform to the cable strain. In addition, the flexibility of the outer potting compound prevents chafing and cut-through of the outer jacket at its emergence point from this outer potting compound. Finally, due to the potting seals located both inside and outside of the shield 14, should water somehow get into the shield region, 14, it is still blocked by the potting layer, 18, from forming a low resistance path between the conductors 10 and 14.

Although the three-layer bonding technique of the present invention may be utilized with a wide variety of cables, it finds its most advantageous application in splicing cables with relatively soft outer jackets. Thus, the present inventive technique has been disclosed in the context of splicing cables with fluoro-polymer (Teflon) jackets. It is, of course, to be understood that this method is not limited thereto and may be advantageously used to splice any cables with relatively soft outer jackets. Any standard potting procedure may be used, the particular one selected depending upon the viscosity and setup time requirements of the particular potting compound used. The water-sealing procedure disclosed is independent of the specific potting method and compound used provided the compound has the disclosed matching physical properties and the potting method used is appropriate for that compound.

Obviously, many modifications and variations of the present invention are possible in light of the above teachings. It is therefore to be understood that, within the scope of the appended claims, the invention may be practiced otherwise than as specifically described.

What is claimed is:

1. A method for forming a three level watertight splice between two coaxial cables, each coaxial cable having an exposed center conductor, an insulating layer around this center conductor, a metallic shield layer encompassing this layer, and an outer jacket, said method comprising the steps of:
   joining the exposed center conductors of the cables to be spliced;
   applying a first potting compound over the exposed sections of the center conductors to form a first watertight cylinder around the center conductors which overlaps the insulating layers of the cables, said potting compound being chosen to be flexible after curing and to have a temperature coefficient substantially matching the temperature coefficient of said insulating layer;
   joining the metallic shield layers of said cables;
   applying a second potting compound over the exposed section of the metallic shielding layer to form a second watertight cylinder which overlaps the outer jackets of cables, said second potting compound being flexible after curing and having a temperature coefficient substantially matching the temperature coefficient of said outer jacket; and
   applying a third potting compound over said second watertight cylinder to form a third watertight cylinder which overlaps the outer jackets of the cables, said third potting compound being chosen for its abrasion resistance and softness to limit chafing and cut-through of said outer jackets of said cables at the point of emergence of of said cables from said third watertight cylinder.

2. A method for splicing coaxial cables as defined in claim 1, wherein said step of applying a first potting compound and said step of applying a second potting compound comprise the step of etching, before the applications of said first and second potting compounds, the outer surfaces of said insulating layer and said outer jacket in the region which said first and second potting compounds will respectively overlap.

3. A method for splicing coaxial cables as defined in claim 1, wherein said insulating layer and said outer jacket are made of a fluoro-polymer material.

4. A cable-splice assembly for providing an effective three level watertight seal at the splice point of two coaxial, abutting cables, each of said coaxial cables having a center conductor with its end exposed, an insulating layer over this center conductor, a metallic shield layer encompassing the insulating layer, and an outer flexible jacket, said coaxial cables being joined at the abutting, exposed ends of their center conductors, said splice-assembly comprising:
   first potting means formed approximately in the shape of a cylinder, covering the exposed section of the center conductors and overlapping the insulating layers of said coaxial cables to form a watertight seal, said first potting means being flexible after curing and having a thermal-expansion coefficient substantially matching the thermalexpansion coefficient of said insulating layer;
   means electrically joining the shielding layers of said coaxial cables;
   second potting means, formed approximately in the shape of a cylinder, covering said joining means of the shielding layers and overlapping the outer flexible jackets of said coaxial cables to form a second watertight seal, said second potting means being composed of material which is flexible after curing and has a thermalexpansion coefficient substantially matching the thermal-expansion coefficient of said outer flexible jacket; and third potting means, formed approximately in the shape of a cylinder, completely covering said second potting means and overlapping the outer jackets of said coaxial cables to form a third watertight seal, said third potting means being composed of material with a soft abrasion resistant physical characteristic to limit chafing and cut-through of said outer jackets of said cables at the point of emergence of said cables from said third watertight seal.

5. A cable-splice assembly as defined in claim 4, wherein said means joining the shielding layers comprises a short piece of braided metallic shielding which is bonded to the shield layers of said coaxial cables.

6. A cable-splice assembly as defined in claim 4, wherein said outer flexible jacket is made from a fluoropolymer material.

7. A cable-splice assembly as recited in claim 4, wherein:
said insulating layer and said outer flexible jacket comprise a fluoropolymer material; and
said first and said second potting means have a coefficient of thermal expansion approximately $12 \times 10^{-5}$ strain per degree centigrade.

* * * * *